(12) United States Patent
King

(10) Patent No.: US 6,772,103 B1
(45) Date of Patent: *Aug. 3, 2004

(54) METHOD FOR SELECTING A PARTS KIT DETAIL

(75) Inventor: David W. King, Johns Island, SC (US)

(73) Assignee: Dow Global Technologies Inc., Midland, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/308,278

(22) PCT Filed: Dec. 15, 1997

(86) PCT No.: PCT/US97/22955
§ 371 (c)(1),
(2), (4) Date: Jul. 9, 1999

(87) PCT Pub. No.: WO98/27413
PCT Pub. Date: Jun. 25, 1998

Related U.S. Application Data

(60) Provisional application No. 60/034,820, filed on Dec. 19, 1996.

(51) Int. Cl.[7] ............ G06F 7/48; G06F 17/60; G06F 15/18; G06F 19/00; G06N 5/00
(52) U.S. Cl. ............ 703/7; 703/1; 703/2; 703/6; 703/9; 705/28; 705/29; 706/15; 706/47; 706/55; 700/99; 700/104; 700/106; 700/107; 700/117; 700/242
(58) Field of Search ............ 703/1, 7, 2, 6, 703/9; 705/29, 28; 706/15, 47, 55; 700/99, 103, 104, 106, 107, 117, 242

(56) References Cited

U.S. PATENT DOCUMENTS

| | | | | |
|---|---|---|---|---|
| 4,128,013 A | * | 12/1978 | Perry | ............ 73/701 |
| 4,591,983 A | * | 5/1986 | Bennett et al. | ............ 706/53 |
| 4,679,576 A | * | 7/1987 | Yuhara et al. | ............ 132/293 |
| 4,847,761 A | * | 7/1989 | Ferriter et al. | ............ 700/107 |

(List continued on next page.)

FOREIGN PATENT DOCUMENTS

| | | | | |
|---|---|---|---|---|
| JP | 63200950 A | * | 8/1988 | ...... B23Q/41/08 |
| WO | WO 97/22855 | | 6/1997 | |
| WO | WO 97/13138 | * | 10/1997 | ...... G01N/13/02 |

OTHER PUBLICATIONS

The IEEE Standard Dictionary of Electrical and Electronics Tems, 6th Ed. 1996. pp.iv, 255, 262, 484–485, 1144.*

Conn, A.P. "Representation of Decisions in a Requirements Specification Language". Proceedings, COMPSAC '79. pp. 113–116. Nov. 6–8, 1979.*

Rontogiannis et al. "A Probabilistic Approac for Reducing the Search Cost in Binary Decision Trees." IEEE Pacific Rim Conference on Communications, Computers and Signal Processing, 1993. pp.27–30, vol.1. May 19–21, 1993.*

Primary Examiner—Kevin J. Teska
Assistant Examiner—Ayal Sharon

(57) ABSTRACT

A method for selecting a parts kit detail for the installation of a pressure transducer on a container such as a pipeline or a vessel, the container for containing a fluid material, the method including two steps. The first step is to establish at least two different installation categories, each such different installation category being defined by the properties of the fluid material. The second step is to establish at least two different parts kit details, at least two of such different parts kit details being applicable to the different installation categories.

5 Claims, 5 Drawing Sheets

U.S. PATENT DOCUMENTS

| | | | | |
|---|---|---|---|---|
| 5,307,261 A | * | 4/1994 | Maki et al. | 700/107 |
| 5,311,424 A | * | 5/1994 | Mukherjee et al. | 700/105 |
| 5,412,576 A | * | 5/1995 | Hansen | 700/104 |
| 5,501,331 A | * | 3/1996 | Lyall et al. | 137/15.08 |
| 5,515,269 A | * | 5/1996 | Willis et al. | 705/29 |
| 5,787,274 A | * | 7/1998 | Agrawal et al. | 707/100 |
| 5,799,311 A | * | 8/1998 | Agrawal et al. | 382/168 |
| 5,870,717 A | * | 2/1999 | Wiecha | 705/26 |
| 5,870,735 A | * | 2/1999 | Agrawal et al. | 707/3 |
| 5,995,979 A | * | 11/1999 | Cochran | 707/102 |
| 5,999,082 A | * | 12/1999 | Kurtz et al. | 338/36 |

* cited by examiner

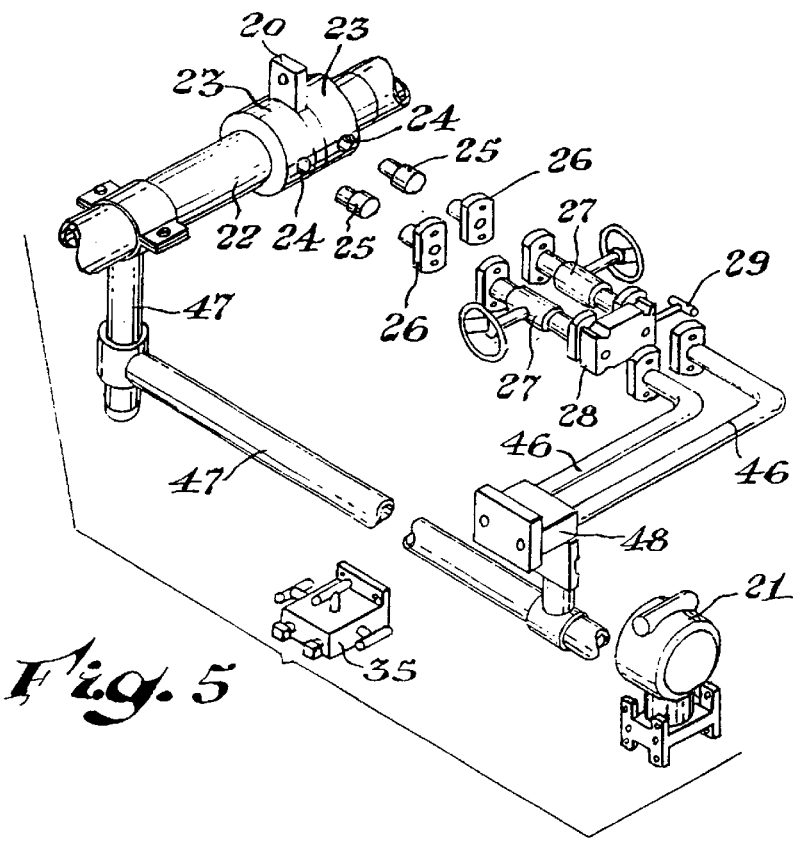
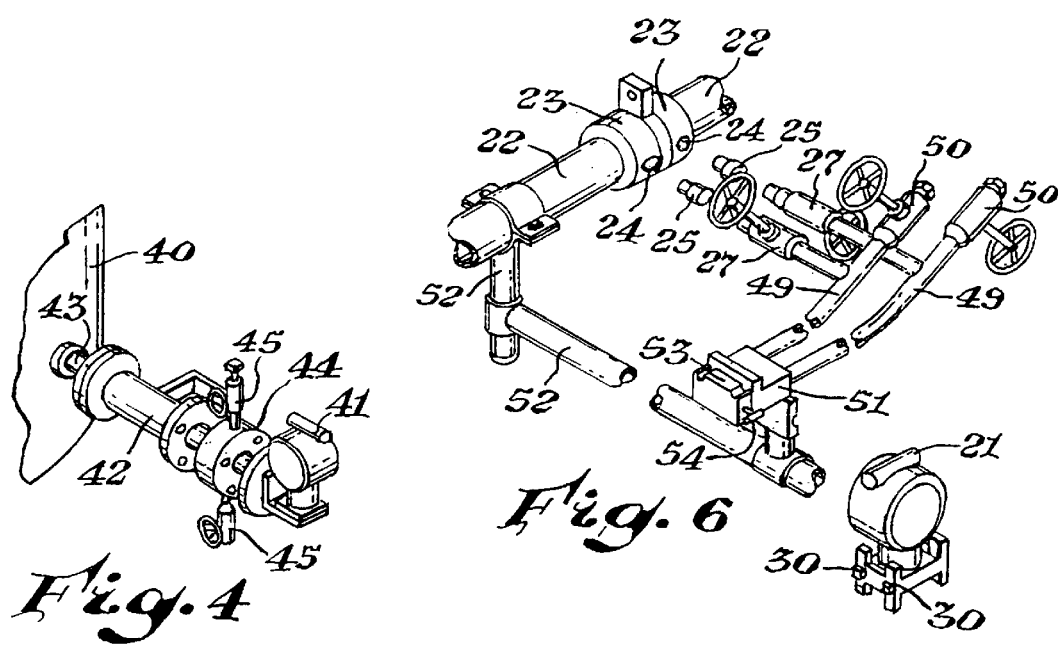

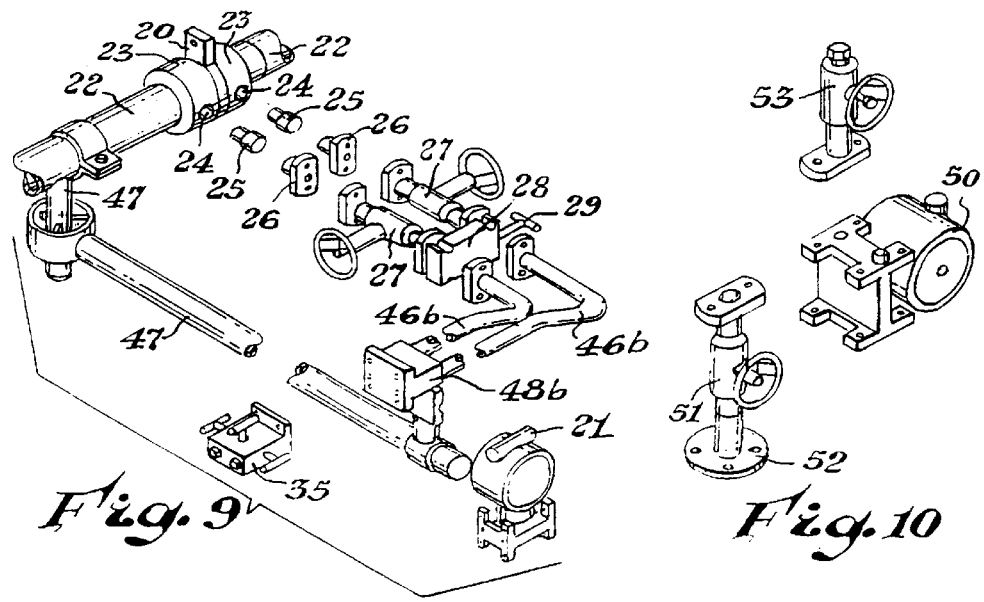
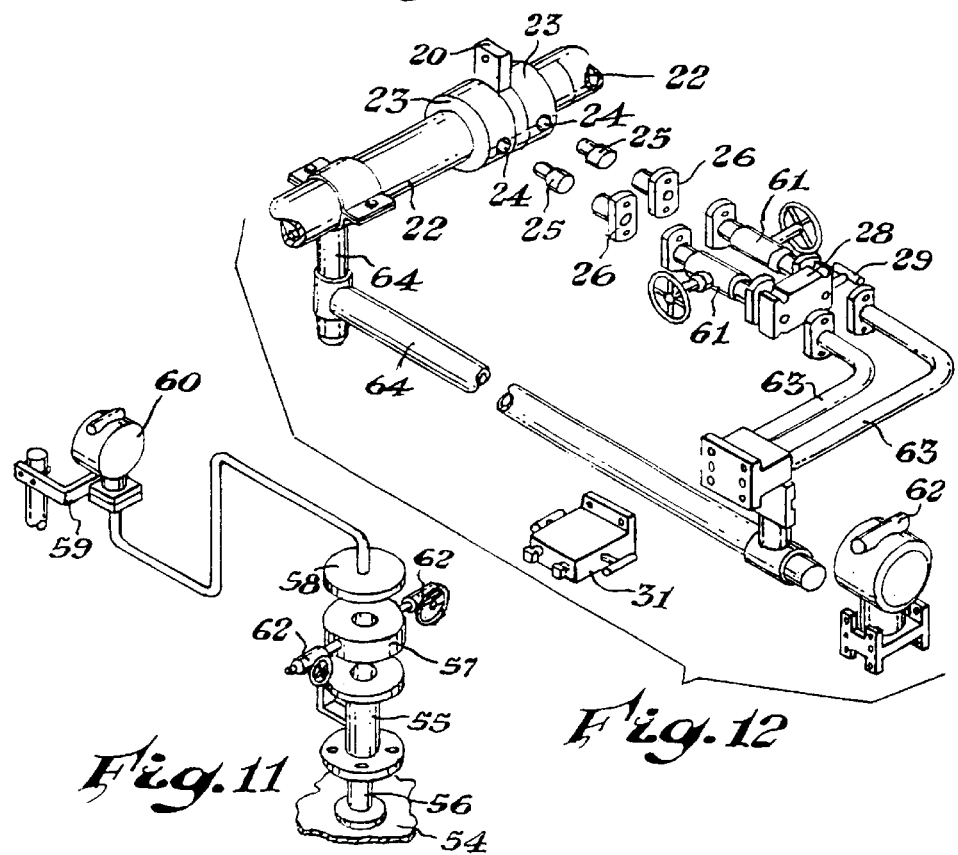

METHOD FOR SELECTING A PARTS KIT DETAIL

This application claims the benefit of provisional application Ser. No. 60/034,820 filed Dec. 19, 1996.

Most modern chemical processing facilities use numerous pressure transducers to determine pressure and flow rate of fluids being conveyed in pipe lines. In addition, such facilities use pressure transducers to determine pressure and level in process vessels.

Safety considerations require that the pressure transducers be installed using materials of construction and of a design which will safely withstand exposure to the material contained in the process pipe or vessel at the temperature and pressure of the material. Safety considerations also may require that the pressure transducers be installed using flush and drain flanges or other means that allow safe venting and flushing of the material before the transducer is disconnected for service or replacement.

When an instrument engineer needs to specify the kit of parts necessary to install a pressure transducer on a pipe line or vessel, the engineer will design and specify any necessary pipe manifold, block valves, flanges and other parts depending on the properties of the material, such as its pressure, temperature, toxicity as well as the tendency of the material for clogging or plugging passageways. In addition, the physical orientation of the pipe (horizontal or vertical) or vessel will be taken into account.

For a modern chemical processing facility, the instrument engineer will repeat this process for the many pressure transducers that will be installed in the facility. When the instrument engineer is finished, a number of parts kits will have been designed and specified which exactly, in theory, meet the needs of each application. However, since each application is custom designed, the overall process is relatively expensive.

It would be an advance in the art of designing and specifying such parts kits if a method could be developed which standardized the process, to at least some degree, and therefore reduced its cost and resulted in a limited number of standardized designs rather than an almost endless variety of custom designs.

The instant invention is a method for selecting a parts kit in a more standardized manner and at a reduced cost. More specifically, the instant invention is a method for selecting a parts kit detail for the installation of a pressure transducer on a container such as a pipe line or a vessel, the container for containing a fluid material, the method comprising the steps of: establishing at least two different installation categories, each such different installation category being defined by the properties of the fluid material; establishing at least two different parts kit details, at least two of such different parts kit details being applicable to a different installation category; and determining the installation category for the fluid material so that at least one parts kit detail can be selected for the installation.

FIG. 4 shows a parts kit detail for a level measurement pressure transducer on a vessel for installation categories 2, 4 and 5;

FIG. 5 shows a parts kit detail for an orifice plate differential pressure transducer on a horizontal pipe line for installation category 5A;

FIG. 6 shows a parts kit detail for an orifice plate differential pressure transducer on a horizontal pipe line for installation category 5B;

FIG. 9 shows a parts kit detail for an orifice plate differential pressure transducer on a horizontal pipe line for installation category 7;

FIG. 10 shows a parts kit detail for a pressure transducer on a pipe line or a vessel for installation category 8;

FIG. 11 shows a parts kit detail for a pressure transducer on a pipe line or a vessel for installation categories 2, 3, 4, 5A, 5B, 6A, 6B, 7 or 9;

FIG. 12 shows a parts kit detail for an orifice plate differential pressure transducer on a horizontal pipe line for installation category 10.

The invention is a method for selecting a parts kit detail for the installation of a pressure transducer on a container such as a pipe line or a vessel, the container for containing a fluid material. The method comprises two steps. The first step is to establish at least two different installation categories, each such different installation category being defined by the properties of the fluid material. The second step is to establish at least two different parts kit details, at least two of such different parts kit details being applicable to a different installation category.

Figure 13:
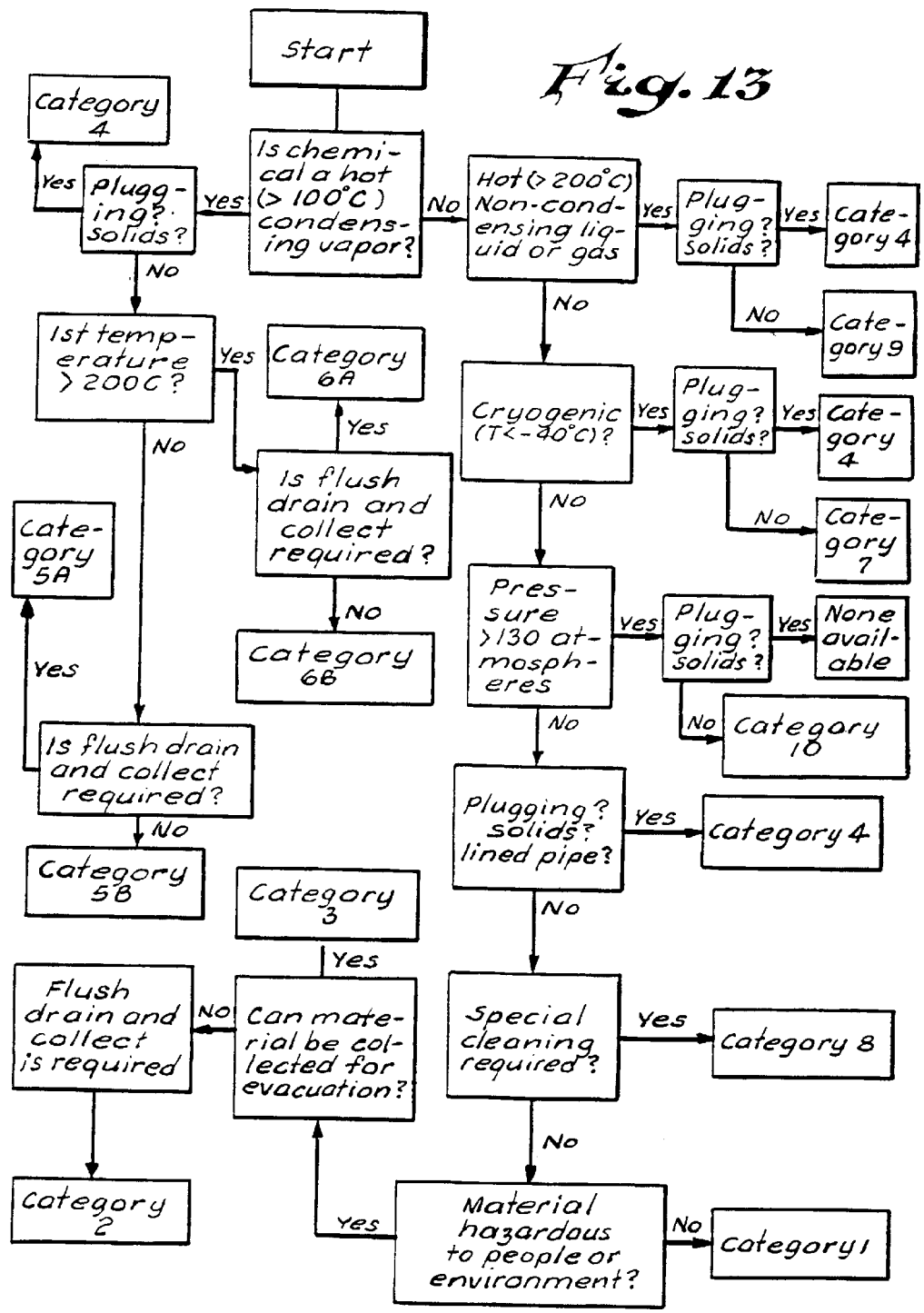
FIG. 13 shows a flow diagram for establishing twelve different installation categories.

Referring now to FIG. 13, therein is shown a flow diagram for establishing twelve different installation categories, that is, categories 1, 2, 3, 4, 5A, 5B, 6A, 6B, 7, 8, 9 and 10. Table I summarizes each category.

TABLE I

| CATEGORIES OF MATERIALS | |
| --- | --- |
| CATEGORY 1 | MATERIALS THAT CAN BE SAFELY VENTED TO THE ATMOSPHERE OR COLLECTED IN A CONTAINER. (FOR EXAMPLE WATER, AIR, NITROGEN) |
| CATEGORY 2 | MATERIALS THAT MUST BE FLUSHED OUT OF THE INSTRUMENT SYSTEM AND COLLECTED FOR DISPOSAL IN A VENT COLLECTION SYSTEM OR INCINERATOR. (FOR EXAMPLE BENZENE) |
| CATEGORY 3 | MATERIALS THAT CAN BE CLEARED BY EVACUATION, WITHOUT FLUSHING AND COLLECTED FOR DISPOSAL IN A VACUUM SYSTEM. (FOR EXAMPLE FREON) |
| CATEGORY 4 | MATERIALS THAT ARE PRONE TO PLUGGING, FREEZING, POLYMERIZING. (FOR EXAMPLE STYRENE MONOMER, 50 PERCENT NaOH IN WATER) |
| CATEGORY 5A | HOT VAPORS (100–200 C.) THAT CAN CONDENSE AT OPERATING TEMPERATURES ABOVE 100 C., AND MUST BE COLLECTED OR FLUSHED. |
| CATEGORY 5B | HOT VAPORS (100–200 C.) THAT CAN CONDENSE AT OPERATING TEMPERATURES ABOVE 100 C., AND NEED NOT BE FLUSHED (FOR EXAMPLE STEAM) |
| CATEGORY 6A | HOT VAPORS (100–200 C.) THAT CAN CONDENSE AT OPERATING TEMPERATURES ABOVE 100 C., AND MUST BE COLLECTED OR FLUSHED. |

TABLE I-continued

CATEGORIES OF MATERIALS

| | |
|---|---|
| CATEGORY 6B | HOT VAPORS (>200 C.) THAT CAN CONDENSE AT OPERATING TEMPERATURES ABOVE 100 C., AND NEED NOT BE FLUSHED. (FOR EXAMPLE STEAM AT A PRESSURE OF 80 ATMOSPHERES) |
| CATEGORY 7 | CRYOGENIC LIQUIDS, TEMPERATURES <−40 C. |
| CATEGORY 8 | SYSTEMS THAT HAVE TO BE THOROUGHLY CLEANED BETWEEN RUNS. (FOR EXAMPLE PHARMACEUTICAL CHEMICALS) |
| CATEGORY 9 | HIGH TEMPERATURE (>200 C.), NON-CONDENSING LIQUIDS OR GASES (FOR EXAMPLE HOT NITROGEN) |
| CATEGORY 10 | HIGH PRESSURE. (>130 ATMOSPHERES) |

Each category is defined by the properties of the material in the pipe line or vessel such as its temperature, pressure, toxicity or other safety hazard, and its tendency to plug passageways through which it is flowed.

Of course, the scheme shown in FIG. 13 is but one example of any number of possible alternatives. What is critical in the instant invention is that at least two such categories must be defined by the properties of the material. The material can be any fluid such as a gas or a liquid. For example, the material can be steam or water. In its full scope, the material can be any of the myriad of chemicals and mixtures of chemicals of a modern chemical process facility, including a refinery or a pipeline facility, including gases, liquids and slurries.

Referring now to Table II, therein are described in excess of one hundred and sixty parts kit details.

TABLE II

| DETAIL NUMBER | DESCRIPTION |
|---|---|
| 3351-00 | CATEGORY 1; WEDGE METER, DIFFERENTIAL PRESSURE TRANSMITTER, HORIZONTAL PIPE, VENTED, DIRECT MOUNT |
| 3351-02 | CATEGORY 2: WEDGE METER, DIFFERENTIAL PRESSURE TRANSMITTER, HORIZONTAL PIPE, FLUSH/DRAIN, DIRECT MOUNT |
| 3351-05 | CATEGORY 3: WEDGE METER, DIFFERENTIAL PRESSURE TRANSMITTER, HORIZONTAL PIPE, COLLECTABLE VENT, DIRECT MOUNT |
| 3351-10 | CATEGORY 1: WEDGE METER, DIFFERENTIAL PRESSURE TRANSMITTER, HORIZONTAL PIPE, VENTED, SUPPORTED |
| 3351-12 | CATEGORY 2: WEDGE METER, DIFFERENTIAL PRESSURE TRANSMITTER, HORIZONTAL PIPE, FLUSH/DRAIN, SUPPORTED |
| 3351-15 | CATEGORY 3: WEDGE METER, DIFFERENTIAL PRESSURE TRANSMITTER, HORIZONTAL PIPE, COLLECTABLE VENT, SUPPORTED |
| 3351-20 | CATEGORY 1: WEDGE METER, DIFFERENTIAL PRESSURE AND PRESSURE TRANSMITTER, HORIZONTAL PIPE, VENTED, SUPPORTED |
| 3351-22 | CATEGORY 2: WEDGE METER, DIFFERENTIAL PRESSURE AND PRESSURE TRANSMITTER, HORIZONTAL PIPE, FLUSH/DRAIN, SUPPORTED |
| 3351-25 | CATEGORY 3: WEDGE METER, DIFFERENTIAL PRESSURE AND PRESSURE TRANSMITTER, HORIZONTAL PIPE, COLLECTABLE VENT, SUPPORTED |
| 3352-10 | CATEGORY 5B: WEDGE METER, DIFFERENTIAL PRESSURE TRANSMITTER, HORIZONTAL PIPE, STEAM AT A PRESSURE OF LESS THAN 17 ATMOSPHERES, SUPPORTED |
| 3352-20 | CATEGORY 5B: WEDGE METER, DIFFERENTIAL PRESSURE AND PRESSURE TRANSMITTER, HORIZONTAL PIPE, STEAM AT A PRESSURE OF LESS THAN 17 ATMOSPHERES, SUPPORTED |
| 3353-10 | CATEGORY 6B: WEDGE METER, DIFFERENTIAL PRESSURE TRANSMITTER, HORIZONTAL PIPE, STEAM AT A PRESSURE OF FROM 17–100 ATMOSPHERES, SUPPORTED |
| 3353-20 | CATEGORY 6B: WEDGE METER, DIFFERENTIAL PRESSURE AND PRESSURE TRANSMITTER, HORIZONTAL PIPE, STEAM AT A PRESSURE OF FROM 17–100 ATMOSPHERES, SUPPORTED |
| 3354-12 | CATEGORY 5A: WEDGE METER, DIFFERENTIAL PRESSURE, HORIZONTAL PIPE, CONDENSED VAPORS 100–205 C., FLUSH/DRAIN, SUPPORTED |
| 3354-22 | CATEGORY 5A: WEDGE METER, DIFFERENTIAL PRESSURE AND PRESSURE TRANSMITTER, HORIZONTAL PIPE, CONDENSED VAPOR 100–205 C., FLUSH/DRAIN, SUPPORTED |
| 3355-12 | CATEGORY 6A: WEDGE METER, DIFFERENTIAL PRESSURE TRANSMITTER, HORIZONTAL PIPE, CONDENSED VAPOR 205–315C., FLUSH/DRAIN, SUPPORTED |
| 3355-22 | CATEGORY 6A: WEDGE METER, DIFFERENTIAL PRESSURE AND PRESSURE TRANSMITTER, HORIZONTAL PIPE, CONDENSED VAPOR 205–315 C., FLUSH/DRAIN, SUPPORTED |
| 3358-12 | CATEGORY 10: WEDGE METER, DIFFERENTIAL PRESSURE TRANSMITTER, HORIZONTAL PIPE, >130 ATMOSPHERES PRESSURE, FLUSH/DRAIN, SUPPORTED |
| 3361-00 | CATEGORY 1: VENTURI, DIFFERENTIAL PRESSURE, HORIZONTAL PIPE, VENTED, DIRECT MOUNT |
| 3361-02 | CATEGORY 2: VENTURI, DIFFERENTIAL PRESSURE, HORIZONTAL PIPE, FLUSH/DRAIN, DIRECT MOUNT |
| 3361-05 | CATEGORY 3: VENTURI, DIFFERENTIAL PRESSURE, HORIZONTAL PIPE, VENTED, SUPPORTED |
| 3361-10 | CATEGORY 1: VENTURI, DIFFERENTIAL PRESSURE, HORIZONTAL PIPE, COLLECTABLE VENT, DIRECT MOUNT |
| 3361-12 | CATEGORY 2: VENTURI, DIFFERENTIAL PRESSURE, HORIZONTAL PIPE, FLUSH/DRAIN, SUPPORTED |
| 3361-15 | CATEGORY 3: VENTURI, DIFFERENTIAL PRESSURE, HORIZONTAL PIPE, COLLECTABLE VENT, SUPPORTED |
| 3361-20 | CATEGORY 1: VENTURI, DIFFERENTIAL PRESSURE AND PRESSURE TRANSMITTER, HORIZONTAL PIPE, VENTED, SUPPORTED |
| 3361-22 | CATEGORY 2: VENTURI, DIFFERENTIAL PRESSURE AND PRESSURE TRANSMITTER, HORIZONTAL PIPE, FLUSH/DRAIN, SUPPORTED |
| 3361-25 | CATEGORY 3: VENTURI, DIFFERENTIAL PRESSURE AND PRESSURE TRANSMITTER, HORIZONTAL PIPE, COLLECTABLE VENT, SUPPORTED |
| 3362-10 | CATEGORY 5B: VENTURI, DIFFERENTIAL PRESSURE, HORIZONTAL PIPE, STEAM <17 ATMOSPHERES, SUPPORTED |
| 3362-20 | CATEGORY 5B: VENTURI, DIFFERENTIAL PRESSURE AND PRESSURE TRANSMITTER, HORIZONTAL PIPE, STEAM <17 ATMOSPHERES, SUPPORTED |
| 3363-10 | CATEGORY 6B: VENTURI, DIFFERENTIAL PRESSURE, HORIZONTAL PIPE, STEAM AT A PRESSURE OF 17–100 ATMOSPHERES, SUPPORTED |

TABLE II-continued

| DETAIL NUMBER | DESCRIPTION |
| --- | --- |
| 3363-20 | CATEGORY 6B: VENTURI, DIFFERENTIAL PRESSURE AND PRESSURE TRANSMITTER, HORIZONTAL PIPE, STEAM AT A PRESSURE OF 17–100 ATMOSPHERES, SUPPORTED |
| 3364-12 | CATEGORY 5A: VENTURI, DIFFERENTIAL PRESSURE TRANSMITTER, HORIZONTAL PIPE, CONDENSED VAPOR 100–250 C., FLUSH/DRAIN, SUPPORTED |
| 3364-22 | CATEGORY 5A: VENTURI, DIFFERENTIAL PRESSURE AND PRESSURE TRANSMITTER, HORIZONTAL PIPE, CONDENSED VAPOR 100–250 C., FLUSH/DRAIN, SUPPORTED |
| 3365-12 | CATEGORY 6A: VENTURI, DIFFERENTIAL PRESSURE, HORIZONTAL PIPE, CONDENSED VAPOR 205–315 C., FLUSH/DRAIN, SUPPORTED |
| 3365-22 | CATEGORY 6A: VENTURI, DIFFERENTIAL PRESSURE AND PRESSURE TRANSMITTER, HORIZONTAL PIPE, CONDENSED VAPOR 205–315 C., FLUSH/DRAIN, SUPPORTED |
| 3368-12 | CATEGORY 10: VENTURI, DIFFERENTIAL PRESSURE, HORIZONTAL PIPE, >130 ATMOSPHERES PRESSURE, FLUSH/DRAIN, SUPPORTED |
| 3411-00 | CATEGORY 1: ORIFICE, DIFFERENTIAL PRESSURE, HORIZONTAL PIPE, VENTED, DIRECT MOUNT |
| 3411-02 | CATEGORY 2: ORIFICE, DIFFERENTIAL PRESSURE, HORIZONTAL PIPE, FLUSH/DRAIN, DIRECT MOUNT |
| 3411-05 | CATEGORY 3: ORIFICE, DIFFERENTIAL PRESSURE, HORIZONTAL PIPE, COLLECTABLE VENT, DIRECT MOUNT |
| 3411-10 | CATEGORY 1: ORIFICE, DIFFERENTIAL PRESSURE, HORIZONTAL PIPE, VENTED, SUPPORTED |
| 3411-12 | CATEGORY 2: ORIFICE, DIFFERENTIAL PRESSURE, HORIZONTAL PIPE, FLUSH/DRAIN, SUPPORTED |
| 3411-15 | CATEGORY 3: ORIFICE, DIFFERENTIAL PRESSURE, HORIZONTAL PIPE, COLLECTABLE VENT, SUPPORTED |
| 3411-20 | CATEGORY 1: ORIFICE, DIFFERENTIAL PRESSURE AND PRESSURE TRANSMITTER, HORIZONTAL PIPE, VENTED, SUPPORTED |
| 3411-22 | CATEGORY 2: ORIFICE, DIFFERENTIAL PRESSURE AND PRESSURE TRANSMITTER, HORIZONTAL PIPE, FLUSH/DRAIN, SUPPORTED |
| 3411-25 | CATEGORY 3: ORIFICE, DIFFERENTIAL PRESSURE AND PRESSURE TRANSMITTER, HORIZONTAL PIPE, COLLECTABLE VENT, SUPPORTED |
| 3412-10 | CATEGORY 5B: ORIFICE, DIFFERENTIAL PRESSURE, HORIZONTAL PIPE, STEAM <17 ATMOSPHERES PRESSURE, SUPPORTED |
| 3412-20 | CATEGORY 5B: ORIFICE, DIFFERENTIAL PRESSURE AND PRESSURE TRANSMITTER, HORIZONTAL PIPE, STEAM <17 ATMOSPHERES PRESSURE, SUPPORTED |
| 3413-10 | CATEGORY 6B: ORIFICE, DIFFERENTIAL PRESSURE, HORIZONTAL PIPE, STEAM AT A PRESSURE 17–100 ATMOSPHERES, SUPPORTED |
| 3413-20 | CATEGORY 6B: ORIFICE, DIFFERENTIAL PRESSURE AND PRESSURE TRANSMITTER, HORIZONTAL PIPE, STEAM AT A PRESSURE OF 17–100 ATMOSPHERES, SUPPORTED |
| 3414-12 | CATEGORY 5A: ORIFICE, DIFFERENTIAL PRESSURE, HORIZONTAL PIPE, CONDENSED VAPOR 100–205 C., FLUSH/DRAIN, SUPPORTED |
| 3414-22 | CATEGORY 5A: ORIFICE, DIFFERENTIAL PRESSURE AND PRESSURE TRANSMITTER, HORIZONTAL PIPE, CONDENSED VAPOR 100–205 C., FLUSH/DRAIN, SUPPORTED |
| 3415-12 | CATEGORY 6A: ORIFICE, DIFFERENTIAL PRESSURE, HORIZONTAL PIPE, CONDENSED VAPOR 205–315 C., FLUSH/DRAIN, SUPPORTED |
| 3415-22 | CATEGORY 6A: ORIFICE, DIFFERENTIAL PRESSURE AND PRESSURE TRANSMITTER, HORIZONTAL PIPE, CONDENSED VAPOR 205–315 C., FLUSH/DRAIN, SUPPORTED |
| 3417-12 | CATEGORY 7: ORIFICE, DIFFERENTIAL PRESSURE, HORIZONTAL PIPE, CRYOGENIC –130 C. TO –20 C., FLUSH/DRAIN, SUPPORTED |
| 3418-12 | CATEGORY 10: ORIFICE, DIFFERENTIAL PRESSURE, HORIZONTAL PIPE, >130 ATMOSPHERES PRESSURE, FLUSH/DRAIN, SUPPORTED |
| 3421-00 | CATEGORY 1: ORIFICE, DIFFERENTIAL PRESSURE, VERTICAL PIPE, VENTED DIRECT MOUNT |
| 3421-05 | CATEGORY 2: ORIFICE, DIFFERENTIAL PRESSURE, VERTICAL PIPE, COLLECTABLE VENT, DIRECT MOUNT |
| 3421-05 | CATEGORY 3: ORIFICE, DIFFERENTIAL PRESSURE, VERTICAL PIPE, COLLECTABLE VENT, DIRECT MOUNT |
| 3421-10 | CATEGORY 1: ORIFICE, DIFFERENTIAL PRESSURE, VERTICAL PIPE, VENTED, SUPPORTED |
| 3421-12 | CATEGORY 2: ORIFICE, DIFFERENTIAL PRESSURE, VERTICAL PIPE, FLUSH/DRAIN, SUPPORTED |
| 3421-15 | CATEGORY 3: ORIFICE, DIFFERENTIAL PRESSURE, VERTICAL PIPE, COLLECTABLE VENT, SUPPORTED |
| 3428-12 | CATEGORY 10: ORIFICE, DIFFERENTIAL PRESSURE, VERTICAL PIPE, >130 ATMOSPHERES PRESSURE, FLUSH/DRAIN, SUPPORTED |
| 4300-01 | CATEGORY 1, 2, 3, 5, 6, 7, 9: ISOLATABLE POINT LEVEL INSTRUMENT INSTALLATION DETAIL |
| 4401-00 | CATEGORY 1: LEVEL, DIFFERENTIAL PRESSURE, TRADITIONAL FLANGE, DIRECT MOUNT, ATMOSPHERIC PRESSURE SERVICE, VENTED |
| 4402-02 | CATEGORY 2, 4: LEVEL, DIFFERENTIAL PRESSURE, INTEGRAL FLANGE, ATMOSPHERIC PRESSURE SERVICE, FLUSH/DRAIN |
| 4402-05 | CATEGORY 3: LEVEL, DIFFERENTIAL PRESSURE, INTEGRAL FLANGE, ATMOSPHERIC PRESSURE SERVICE, FLUSH/DRAIN |
| 4403-02 | CATEGORY 1: LEVEL, DIFFERENTIAL PRESSURE, HTG FLANGE, ATMOSPHERIC/LOW PRESSURE SERVICE |
| 4404-02 | CATEGORY 2, 4, 5: LEVEL, DIFFERENTIAL PRESSURE, "L" FLANGE, ATMOSPHERIC PRESSURE SERVICE, FLUSH/DRAIN |
| 4404-05 | CATEGORY 3: LEVEL, DIFFERENTIAL PRESSURE, "L" FLANGE, ATMOSPHERIC PRESSURE SERVICE, FLUSH/DRAIN |
| 4414-12 | CATEGORY 2, 4, 5: LEVEL, DIFFERENTIAL PRESSURE, "L" FLANGE, FLANGE RELIEF SEAL, FLUSH/DRAIN |
| 4414-15 | CATEGORY 3: LEVEL, DIFFERENTIAL PRESSURE, "L" FLANGE, FLANGE RELIEF SEAL, FLUSH/DRAIN |
| 4414-22 | CATEGORY 2, 4, 5: LEVEL, DIFFERENTIAL PRESSURE TRANSMITTER "L" FLANGE, PANCAKE RELIEF SEAL, FLUSH/DRAIN |
| 4414-25 | CATEGORY 3: LEVEL, DIFFERENTIAL PRESSURE, "L" FLANGE, PANCAKE RELIEF SEAL, FLUSH/DRAIN |

TABLE II-continued

| DETAIL NUMBER | DESCRIPTION |
|---|---|
| 4415-12 | CATEGORY 2, 4, 5, 6, 7, 9: LEVEL, DIFFERENTIAL PRESSURE, FLANGED REMOTE SEALS, POSITIVE PRESSURE SERVICE, FLUSH/DRAIN |
| 4415-15 | CATEGORY 3: LEVEL, DIFFERENTIAL PRESSURE, FLANGED REMOTE SEALS, POSITIVE PRESSURE SERVICE, FLUSH/DRAIN |
| 4415-22 | CATEGORY 2, 4, 5, 6, 7, 9: LEVEL, DIFFERENTIAL PRESSURE, PANCAKE REMOTE SEALS, POSITIVE PRESSURE SERVICE, FLUSH/DRAIN |
| 4415-25 | CATEGORY 3: LEVEL, DIFFERENTIAL PRESSURE, PANCAKE REMOTE SEAL, POSITIVE PRESSURE SERVICE, FLUSH/DRAIN |
| 4416-12 | CATEGORY 2, 4, 5, 6, 7, 9: LEVEL, DIFFERENTIAL PRESSURE, FLANGED REMOTE SEALS, VACUUM SERVICE, FLUSH/DRAIN |
| 4416-15 | CATEGORY 3: LEVEL, DIFFERENTIAL PRESSURE, FLANGED REMOTE SEALS, VACUUM SERVICE, FLUSH/DRAIN |
| 4416-22 | CATEGORY 2, 4, 5, 6, 7, 9: LEVEL, DIFFERENTIAL PRESSURE, PANCAKE REMOTE SEALS, VACUUM SERVICE, FLUSH/DRAIN |
| 4416-25 | CATEGORY 3: LEVEL, DIFFERENTIAL PRESSURE, PANCAKE REMOTE SEALS, VACUUM SERVICE, FLUSH/DRAIN |
| 5201-12 | CATEGORY 2: DIAPHRAGM PRESSURE GAUGE, HORIZONTAL BRANCH CONNECTION, FLUSH/DRAIN, DIRECT MOUNT |
| 5201-14 | CATEGORY 3: DIAPHRAGM PRESSURE GAUGE, HORIZONTAL BRANCH CONNECTION, COLLECT VENT, DIRECT MOUNT |
| 5203-14 | CATEGORY 5B: DIAPHRAGM PRESSURE GAUGE, HORIZONTAL BRANCH CONNECTION, STEAM SERVICE, DIRECT MOUNT |
| 5271-00 | CATEGORY 1 (NON-FLAMMABLE): PRESSURE GAUGE, HORIZONTAL OR VERTICAL BRANCH CONNECTION, VENTED |
| 5271-01 | CATEGORY 1 (FLAMMABLE): PRESSURE GAUGE, HORIZONTAL OR VERTICAL BRANCH CONNECTION, VENTED |
| 5271-02 | CATEGORY 2: PRESSURE GAUGE, VERTICAL BRANCH CONNECTION, FLUSH/DRAIN |
| 5271-03 | CATEGORY 2: PRESSURE GAUGE, HORIZONTAL BRANCH CONNECTION, FLUSH/DRAIN |
| 5271-05 | CATEGORY 3: PRESSURE GAUGE, VERTICAL BRANCH CONNECTION, COLLECTABLE VENT |
| 5271-06 | CATEGORY 3: PRESSURE GAUGE, HORIZONTAL BRANCH CONNECTION, COLLECTABLE VENT |
| 5301-02 | CATEGORY 2: PRESSURE SWITCH, HORIZONTAL BRANCH CONNECTION, FLUSH/DRAIN, DIRECT MOUNT |
| 5301-04 | CATEGORY 3: PRESSURE SWITCH, HORIZONTAL BRANCH CONNECTION, COLLECTABLE VENT, DIRECT MOUNT |
| 5301-08 | CATEGORY 8: PRESSURE SWITCH, HORIZONTAL BRANCH, FRANGIBLE FAIL, NO ROOT VALVE, DIRECT MOUNT |
| 5411-00 | CATEGORY 1: DIFFERENTIAL PRESSURE, HORIZONTAL BRANCH CONNECTION, VENTED, DIRECT MOUNT |
| 5411-02 | CATEGORY 2: DIFFERENTIAL PRESSURE, HORIZONTAL BRANCH CONNECTION, FLUSH/DRAIN, DIRECT MOUNT |
| 5476-22 | CATEGORY 2, 3, 4, 5: DIFFERENTIAL PRESSURE, FLUSH RINGS AND PANCAKE REMOTE SEALS |
| 5476-32 | CATEGORY 2, 3, 4, 5: DIFFERENTIAL PRESSURE, FLUSH RINGS AND PANCAKE REMOTE SEALS |
| 5476-42 | CATEGORY 2, 3, 4, 5: DIFFERENTIAL PRESSURE, FLUSH RINGS AND PANCAKE REMOTE SEALS |
| 5476-52 | CATEGORY 2, 3, 4, 5, 6, 7, 9: DIFFERENTIAL PRESSURE, FLUSH RINGS AND PANCAKE REMOTE SEALS |
| 5476-62 | CATEGORY 2, 3, 4, 5, 6, 7, 9: DIFFERENTIAL PRESSURE, FLUSH RINGS AND NON-ANSI FLANGE REMOTE SEALS |
| 5476-72 | CATEGORY 2, 3, 4, 5, 6, 7, 9: DIFFERENTIAL PRESSURE, FLUSH RINGS AND ANSI FLANGE REMOTE SEALS |
| 5501-00 | CATEGORY 1: PRESSURE TRANSMITTER, HORIZONTAL OR VERTICAL BRANCH CONNECTION, VENTED, DIRECT MOUNT |
| 5501-01 | CATEGORY 1: PRESSURE TRANSMITTER, RETROFIT APPLICATIONS FOR DETAIL NUMBER 5501-00 |
| 5501-03 | CATEGORY 2: PRESSURE TRANSMITTER, HORIZONTAL OR VERTICAL PIPE, HORIZONTAL BRANCH, FLUSH/DRAIN, DIRECT MOUNT |
| 5501-04 | CATEGORY 2: PRESSURE TRANSMITTER, RETROFIT APPLICATIONS FOR DETAIL NUMBER 5501-03 |
| 5501-05 | CATEGORY 3: PRESSURE TRANSMITTER, HORIZONTAL OR VERTICAL BRANCH CONNECTION, COLLECTABLE VENT, DIRECT MOUNT |
| 5501-06 | CATEGORY 3: PRESSURE TRANSMITTER, RETROFIT APPLICATIONS FOR DETAIL NUMBER 5501-05 |
| 5502-00 | CATEGORY 5B: PRESSURE TRANSMITTER, HORIZONTAL OR VERTICAL PIPE, HORIZONTAL BRANCH, STEAM <17 ATMOSPHERES PRESSURE, DIRECT MOUNT |
| 5504-03 | CATEGORY 5A: PRESSURE TRANSMITTER, PIPE, HORIZONTAL BRANCH, CONDENSING VAPOR 100–250 C., FLUSH/DRAIN, DIRECT MOUNT |
| 5511-10 | CATEGORY 1: PRESSURE TRANSMITTER, HORIZONTAL PIPE, HORIZONTAL BRANCH, VENTED, SUPPORTED |
| 5511-11 | CATEGORY 1: PRESSURE TRANSMITTER, RETROFIT APPLICATIONS FOR DETAIL NUMBER 5511-10 |
| 5511-13 | CATEGORY 2: PRESSURE TRANSMITTER, HORIZONTAL PIPE BRANCH, FLUSH/DRAIN, SUPPORTED |
| 5511-15 | CATEGORY 3: PRESSURE TRANSMITTER, HORIZONTAL PIPE/BRANCH, COLLECTABLE VENT, SUPPORTED |
| 5511-16 | CATEGORY 3: PRESSURE TRANSMITTER, RETROFIT APPLICATIONS FOR DETAIL NUMBER 5511-15 |
| 5511-86 | CATEGORY 8: PRESSURE TRANSMITTER, HORIZONTAL OR VERTICAL PIPE/BRANCH, FLUSHING ROOT VALVES, FDA/EPA CLEANING |
| 5511-87 | CATEGORY 8: PRESSURE TRANSMITTER, HORIZONTAL OR VERTICAL PIPE/BRANCH, ROOT VALVES WITH NO FLUSH/DRAIN VALVE, FDA/EPA CLEANING |
| 5511-88 | CATEGORY 8: PRESSURE TRANSMITTER, HORIZONTAL OR VERTICAL PIPE/BRANCH, FLUSH/DRAIN, NO ROOT VALVE, FDA/EPA CLEANING |
| 5511-89 | CATEGORY 8: PRESSURE TRANSMITTER, HORIZONTAL OR VERTICAL PIPE/BRANCH, NO ROOT VALVE, NO FLUSH/DRAIN, FDA/EPA CLEANING |
| 5512-10 | CATEGORY 5B: PRESSURE TRANSMITTER, HORIZONTAL PIPE/BRANCH, STEAM <17 ATMOSPHERES PRESSURE, SUPPORTED |
| 5512-11 | CATEGORY 5B: PRESSURE TRANSMITTER, RETROFIT APPLICATIONS FOR DETAIL NUMBER 5512-10 |
| 5513-10 | CATEGORY 6B: PRESSURE TRANSMITTER, HORIZONTAL PIPE/BRANCH, STEAM 17–100 ATMOSPHERES, SUPPORTED |
| 5514-13 | CATEGORY 5A: PRESSURE TRANSMITTER, HORIZONTAL PIPE/BRANCH, CONDENSED VAPOR 100–250 C., FLUSH/DRAIN, SUPPORTED |
| 5515-13 | CATEGORY 6A: PRESSURE TRANSMITTER, HORIZONTAL PIPE/BRANCH, CONDENSED VAPOR 205–315 C., FLUSH/DRAIN, SUPPORTED |
| 5517-13 | CATEGORY 7: PRESSURE TRANSMITTER, HORIZONTAL PIPE/BRANCH CRYOGENIC −130 C. TO −20 C., FLUSH/DRAIN SUPPORTED |

TABLE II-continued

| DETAIL NUMBER | DESCRIPTION |
| --- | --- |
| 5518-13 | CATEGORY 10: PRESSURE TRANSMITTER, HORIZONTAL PIPE/BRANCH, >130 ATMOSPHERES, FLUSH/DRAIN, SUPPORTED |
| 5521-10 | CATEGORY 1: PRESSURE TRANSMITTER, VERTICAL PIPE, HORIZONTAL BRANCH, VENTED, SUPPORTED |
| 5521-13 | CATEGORY 2: PRESSURE TRANSMITTER, VERTICAL PIPE, HORIZONTAL BRANCH, FLUSH/DRAIN, SUPPORTED |
| 5521-15 | CATEGORY 3: PRESSURE TRANSMITTER, VERTICAL PIPE, HORIZONTAL BRANCH, COLLECTABLE VENT, SUPPORTED |
| 5522-10 | CATEGORY 5B: PRESSURE TRANSMITTER, VERTICAL PIPE, HORIZONTAL BRANCH, STEAM <17 ATMOSPHERES, SUPPORTED |
| 5523-10 | CATEGORY 6B: PRESSURE TRANSMITTER, VERTICAL PIPE, HORIZONTAL BRANCH, STEAM 17–100 ATMOSPHERES, SUPPORTED |
| 5524-13 | CATEGORY 5A: PRESSURE TRANSMITTER, VERTICAL PIPE, CONDENSED VAPOR 100–205 C., FLUSH/DRAIN, SUPPORTED |
| 5525-13 | CATEGORY 6A: PRESSURE TRANSMITTER, VERTICAL PIPE, CONDENSED VAPOR 205–315 C., FLUSH/DRAIN, SUPPORTED |
| 5527-13 | CATEGORY 7A: PRESSURE TRANSMITTER, VERTICAL PIPE, CRYOGENIC −130 C. TO −20 C., FLUSH/DRAIN, SUPPORTED |
| 5528-13 | CATEGORY 10: PRESSURE TRANSMITTER, VERTICAL PIPE, HORIZONTAL BRANCH, >130 ATMOSPHERES, FLUSH/DRAIN, SUPPORTED |
| 5531-02 | CATEGORY 2: PRESSURE TRANSMITTER, HORIZONTAL PIPE, HORIZONTAL OR VERTICAL BRANCH, FLUSH/DRAIN DIRECT MOUNT |
| 5531-05 | CATEGORY 3: PRESSURE TRANSMITTER, HORIZONTAL PIPE, HORIZONTAL OR VERTICAL BRANCH, COLLECTABLE VENT, DIRECT MOUNT |
| 5538-02 | CATEGORY 10: PRESSURE TRANSMITTER, HORIZONTAL PIPE, HORIZONTAL OR VERTICAL BRANCH, >130 ATMOSPHERES PRESSURE, FLUSH/DRAIN, DIRECT MOUNT |
| 5541-00 | CATEGORY 1: PRESSURE TRANSMITTER, VESSEL, HORIZONTAL OR VERTICAL NOZZLE, VENTED, DIRECT MOUNT |
| 5541-02 | CATEGORY 2: PRESSURE TRANSMITTER, VESSEL, HORIZONTAL OR VERTICAL NOZZLE, FLUSH/DRAIN, DIRECT MOUNT |
| 5541-05 | CATEGORY 3: PRESSURE TRANSMITTER, VESSEL, HORIZONTAL OR VERTICAL NOZZLE, COLLECTABLE VENT, DIRECT MOUNT |
| 5548-02 | CATEGORY 10: PRESSURE TRANSMITTER, VESSEL, HORIZONTAL OR VERTICAL NOZZLE, >130 ATMOSPHERES PRESSURE, FLUSH/DRAIN, DIRECT MOUNT |
| 5552-00 | CATEGORY 5B: PRESSURE TRANSMITTER, VESSEL, HORIZONTAL NOZZLE, STEAM <17 ATMOSPHERES, DIRECT MOUNT |
| 5552-10 | CATEGORY 5B: PRESSURE TRANSMITTER, VESSEL, HORIZONTAL NOZZLE, STEAM <17 ATMOSPHERES, SUPPORTED |
| 5553-10 | CATEGORY 6B: PRESSURE TRANSMITTER, VESSEL, HORIZONTAL NOZZLE, STEAM 17–100 ATMOSPHERES, SUPPORTED |
| 5554-03 | CATEGORY 5A: PRESSURE TRANSMITTER, VESSEL, HORIZONTAL NOZZLE, CONDENSED VAPOR 100–205 C., FLUSH/DRAIN, DIRECT MOUNT |
| 5554-13 | CATEGORY 5A: PRESSURE TRANSMITTER, VESSEL, HORIZONTAL NOZZLE, CONDENSED VAPOR 100–205 C., FLUSH/DRAIN, SUPPORTED |
| 5561-86 | CATEGORY 8: PRESSURE TRANSMITTER, VESSEL, HORIZONTAL OR VERTICAL NOZZLE, FLUSH/DRAIN, ROOT VALVES, FDA/EPA CLEANING |
| 5561-87 | CATEGORY 8: PRESSURE TRANSMITTER, VESSEL, HORIZONTAL OR VERTICAL NOZZLE, ROOT VALVE, NO FLUSH VALVES, FDA/EPA CLEANING |
| 5561-88 | CATEGORY 8: PRESSURE TRANSMITTER, VESSEL, HORIZONTAL OR VERTICAL NOZZLE, FLUSH/DRAIN, NO ROOT VALVES, FDA/EPA CLEANING |
| 5561-89 | CATEGORY 8: PRESSURE TRANSMITTER, VESSEL, HORIZONTAL OR VERTICAL NOZZLE, NO ROOT VALVE, FLUSH/DRAIN, FDA/EPA CLEANING |
| 5562-00 | CATEGORY 5B: PRESSURE TRANSMITTER, VESSEL, VERTICAL NOZZLE, STEAM <17 ATMOSPHERES, DIRECT MOUNT |
| 5562-10 | CATEGORY 5B: PRESSURE TRANSMITTER, VESSEL, VERTICAL NOZZLE, STEAM <17 ATMOSPHERES, SUPPORTED |
| 5563-10 | CATEGORY 6B: PRESSURE TRANSMITTER, VESSEL, VERTICAL NOZZLE, STEAM 17–100 ATMOSPHERES, SUPPORTED |
| 5564-03 | CATEGORY 5A: PRESSURE TRANSMITTER, VESSEL, VERTICAL NOZZLE, CONDENSED VAPOR 100–205 C., FLUSH/DRAIN, DIRECT MOUNT |
| 5564-13 | CATEGORY 5A: PRESSURE TRANSMITTER VESSEL, VERTICAL NOZZLE, CONDENSED VAPOR 100–205 C. FLUSH/DRAIN, SUPPORTED |
| 5565-13 | CATEGORY 6A: PRESSURE TRANSMITTER, VESSEL, VERTICAL NOZZLE, CONDENSED VAPOR 205–315 C., FLUSH/DRAIN, SUPPORTED |
| 5576-32 | CATEGORY 2, 3, 4: PRESSURE TRANSMITTER, INTEGRAL FLANGE, METAL FLUSH RING, HORIZONTAL OR VERTICAL PIPE OR VESSEL |
| 5576-42 | CATEGORY 2, 3, 4, 5: PRESSURE TRANSMITTER, "L" FLANGE, METAL FLUSH RING, HORIZONTAL OR VERTICAL PIPE OR VESSEL |
| 5576-49 | CATEGORY 4, 8: PRESSURE TRANSMITTER, "L" FLANGE, DIRECT MOUNT, NO FLUSH RING, HORIZONTAL OR VERTICAL PIPE/VESSEL CONNECTION |
| 5576-52 | CATEGORY 2, 3, 4, 5, 6, 7, 9: PRESSURE TRANSMITTER, METAL FLUSH RING, PANCAKE REMOTE SEAL, HORIZONTAL OR VERTICAL PIPE/VESSEL |
| 5576-62 | CATEGORY 2, 3, 4, 5, 6, 7, 9: PRESSURE TRANSMITTER, METAL FLUSH RING, NON-ANSI FLANGE, REMOTE SEAL, HORIZONTAL OR VERTICAL CONNECTION |
| 5576-72 | CATEGORY 2, 3, 4, 5, 6, 7, 9: PRESSURE TRANSMITTER, METAL FLANGE RING, ANSI FLANGE, REMOTE SEAL, HORIZONTAL OR VERTICAL PIPE/VESSEL |

FIGS. 1–12 show an exemplary sampling of these details. A parts kit detail is a drawing or a list of the primary parts needed to install a pressure responsive instrument on a pipe line or on a vessel according to a standardized design applicable to at least one installation category. Preferably, an individual parts kit detail is applicable to only one installation category. For example, parts kit detail number 3351-00 from Table II is applicable only to category 1. However, it will be noted that some parts kit details, such as 4300-01 from Table II, are applicable to more than one installation category.

When more than one parts kit detail is applicable to an installation category for a specific application, the selection of which detail should be used will depend on a number of factors. For example, on a horizontal pipe wherein the transducer will be supported, an orifice plate, venturi or wedge meter system can be used. Each such system has its advantages and disadvantages as is well known in the art. Thus, the instrument engineer selects the parts kit detail best suited to the application rather than custom designing a kit which theoretically perfectly meets the needs of the application. Almost every installation of a pressure transducer for flow, pressure and level measurement in a modern chemical process facility can be made by using the most appropriate parts kit detail for that installation. The result is a systematic approach that avoids a custom installation for each such application.

Pressure transducers are available from many suppliers, such as the Models 1151 and 3051 pressure and differential pressure transmitters from the Rosemount Measurement Division of Fisher-Rosemount, Eden Prairie, USA, which read absolute pressure (AP) or differential pressure (DP) in most any pressure range encountered in a modern chemical processing facility, including a refinery and a pipeline facility.

Figure 1:
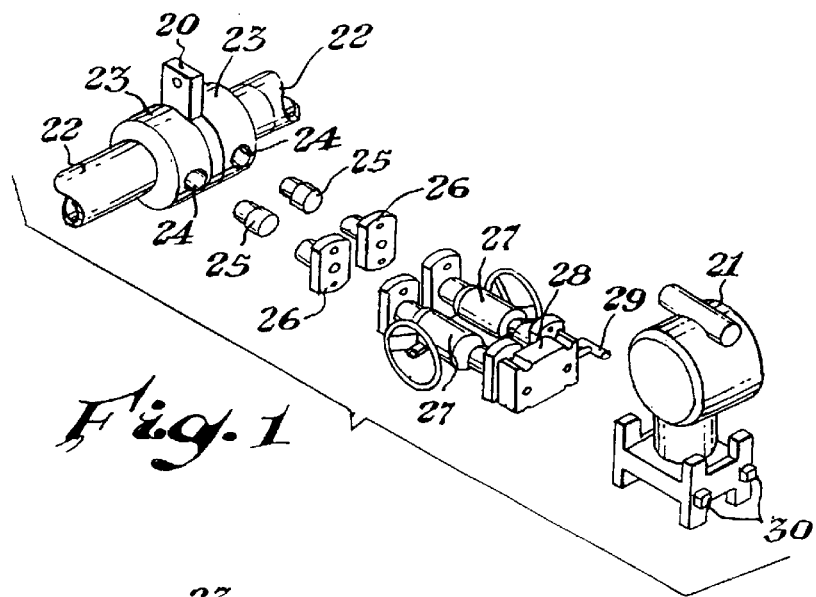
FIG. 1 shows a parts kit detail for an orifice plate differential pressure transducer on a horizontal pipe line for installation category 1.

Referring now to FIG. 1, therein is shown a parts kit detail for an orifice plate 20 differential pressure transducer 21 on a horizontal pipe line 22 for installation category 1. The orifice plate 20 is positioned between a pair of pipe line flanges 23. The pipe line flanges 23 are bored therethrough by passageways 24. Eccentric adapters 25 are to be socket welded into the passageways 24. Rotation of the eccentric adapters 25 about the dotted line axis shown provides a fifty four millimeter spacing between the mouths of the adapters 25 even if the spacing between the passageways 24 varies somewhat from this spacing. Tailpieces 26 are to be socket welded into the adapters 25. Root valves 27 are to be bolted to the tailpieces 26. A bypass manifold 28 is positioned between the valves 27 and the transducer 21. The bypass manifold 28 contains an internal flow control valve, not shown, which is actuated by a handle 29 to zero the transducer 21 when it is installed as indicated in FIG. 1. The transducer 21 has vent ports 30, used to de-pressure the transmitter 21 to the atmosphere, which are shown plugged.

It should be understood that the use of the above described eccentric adapters is not critical in the instant invention. However, reference is made to International Application No. PCT/US 96/20387, since this application relates to such adapters and other hardware described this application.

Figure 2:
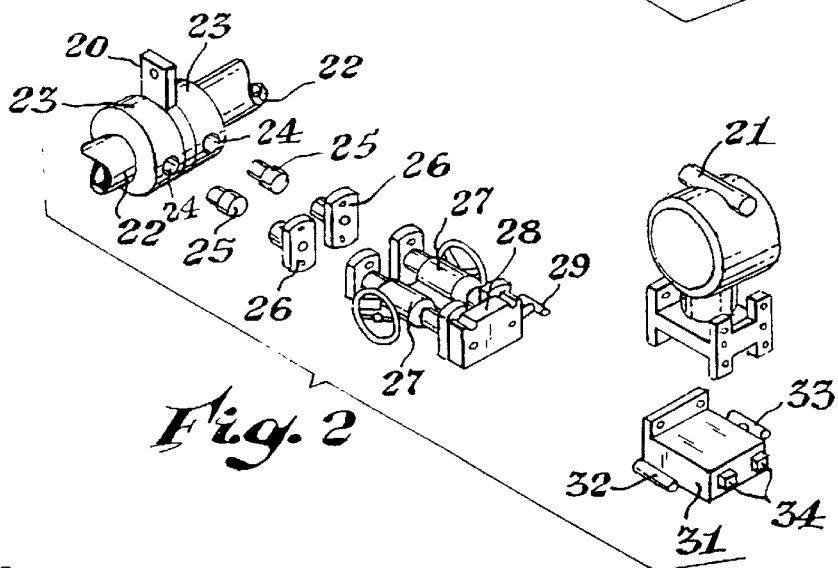
FIG. 2 shows a parts kit detail for an orifice plate differential pressure transducer on a horizontal pipe line for installation category 2.

Referring now to FIG. 2, therein is shown a parts kit detail similar to that shown in FIG. 1 but for installation category 2. The elements shown in FIG. 2 which are the same as FIG. 1 have the same reference numbers. A rear mounted manifold 31 is added to the kit. The rear mounted manifold contains two shut off valves, not shown, which are actuated by a handle 32 and a handle 33. The rear mounted manifold 31 has flushing ports 34 which are shown plugged. However, when the rear mounted manifold is installed as indicated in FIG. 2, it is intended that vent collection tubes, not shown, will be connected to the flushing ports 34 so that actuation of the handles 29, 32 and 33 (and closing valves 27) will facilitate flushing and de-pressuring the transducer 21 before it is removed for service or replacement.

Figure 3:
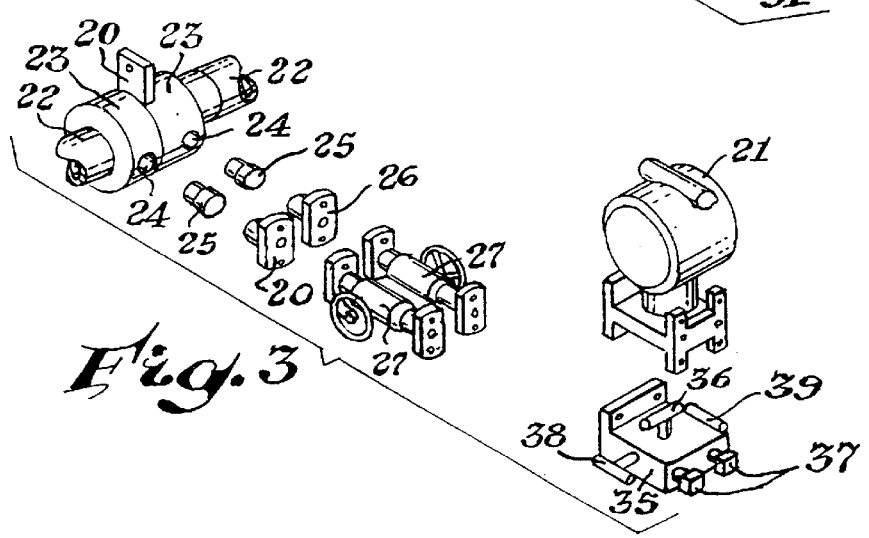
FIG. 3 shows a parts kit detail for an orifice plate differential pressure transducer on a horizontal pipe line for installation category 3.

Referring now to FIG. 3, therein is shown a parts kit detail similar to that shown in FIG. 1 but for installation category 3. The elements shown in FIG. 3 which are the same as FIG. 1 have the same reference numbers. No bypass manifold 28 is used. Instead, a rear mounted three-valve manifold 35 is used. The rear mounted three-valve manifold 35 contains an internal flow control valve, not shown, which is actuated by handle 36 to zero the transducer 21. The bypass rear mounted manifold 35 has flushing ports 37 which are shown plugged. However, when the bypass rear mounted manifold 35 is installed as indicated in FIG. 3, it is intended that vent collection tubes, not shown, will be connected to the flushing ports 37 so that actuation of handles 38 and 39 (and closing valves 27) will facilitate clearing the transducer 21 before it is removed for service or replacement.

Referring now to FIG. 4, therein is shown a parts kit detail for a level measurement pressure transducer 41 on a vessel 40 for installation category 2, 4 and 5. A process isolation valve 42 is shown connected to a nozzle 43 of the vessel 40. A flushing flange 44 is positioned between the transducer 41 and the valve 42. Flushing valves 45 facilitate the flushing away of solids that may have plugged the valve 42, the flange 44 or the transducer 41.

Referring now to FIG. 5, therein is shown a parts kit detail similar, in some respects, to that shown in FIG. 1 but for installation category 5A. The elements shown in FIG. which are the same as FIG. 1 have the same reference numbers. A pipe manifold 30 assembly 46 is positioned between the manifold 28 and the transducer 21. A support assembly 47 supports one end of the pipe manifold assembly 46. The pipes of the pipe manifold assembly 46 dip downward toward the supported end 48 of the pipe manifold assembly 46 so that the hot vapors of the material can condense and collect near the supported end 48 of the pipe manifold assembly 46 to help keep the transducer 21 cooler than if it were exposed directly to the hot vapors of the material. A rear mounted three-valve manifold 35 has the same function and reference number as the rear mounted three-valve manifold of FIG. 3.

Referring now to FIG. 6, therein is shown a parts kit detail similar, in some respects, to that shown in FIG. 1 but for installation category 5B. The elements shown in FIG. 6 which are the same as FIG. 1 have the same reference numbers. It will be noted that the valves 27 are welded into a valve pipe manifold assembly 49 which includes vent valves 50 and a supported end 51. A support assembly 52 supports the supported end 51 of the valve pipe manifold assembly 49. A bypass manifold 53 is positioned between the transducer 21 and the bypass manifold 53. The bypass manifold 53 contains an internal flow control valve, not shown, which is actuated by handle 54 used to zero the transducer 21. The pipes of the valve pipe manifold assembly 49 dip downward toward the supported end 51 of the valve pipe manifold assembly 49 so that the hot vapors of the material can condense and collect near the supported end 51 of the valve pipe manifold assembly 49 to keep the transducer 21 cooler than if it were exposed directly to the hot vapors of the material.

Figure 7:
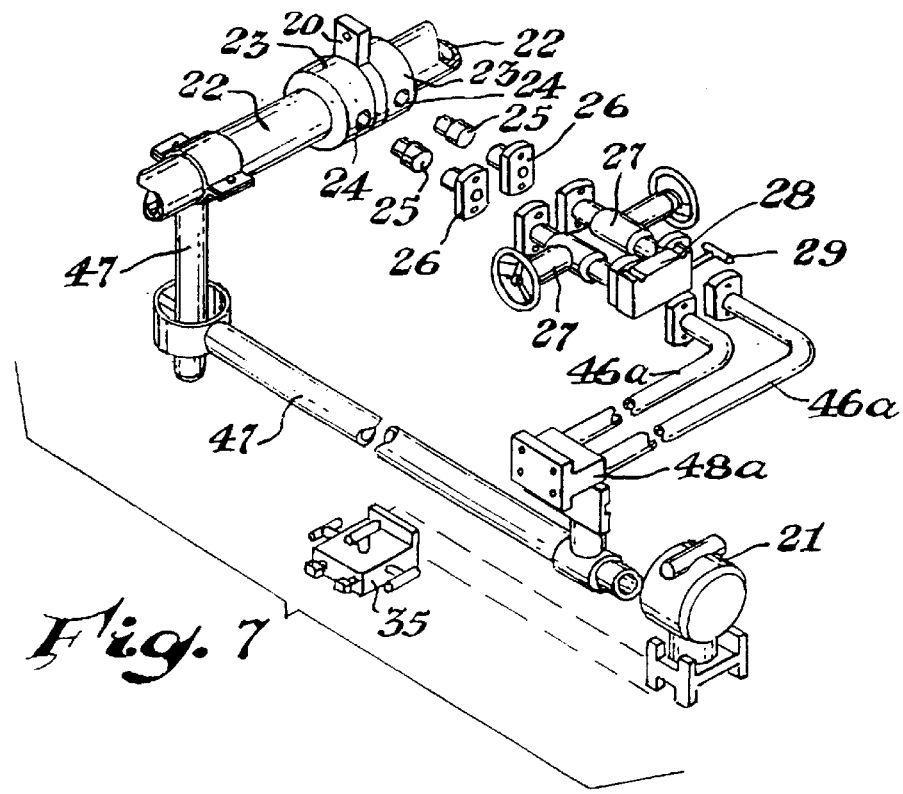
FIG. 7 shows a parts kit detail for an orifice plate differential pressure transducer on a horizontal pipe line for installation category 6A.

Referring now to FIG. 7, therein is shown a parts kit detail similar to that shown in FIG. 5 but for installation category 6A. The elements shown in FIG. 7 which are the same as FIG. 5 have the same reference numbers. The kit shown in FIG. 7 has a pipe manifold assembly 46a and a supported end 48a. The pipe manifold assembly 46a is similar to the pipe manifold assembly 46 of FIG. 5 except that the pipes of the pipe manifold assembly 46a are longer than the pipes of the pipe manifold assembly 46 of FIG. 5. This longer length helps to better isolate the transducer 21 from the hot vapors of material.

Figure 8:
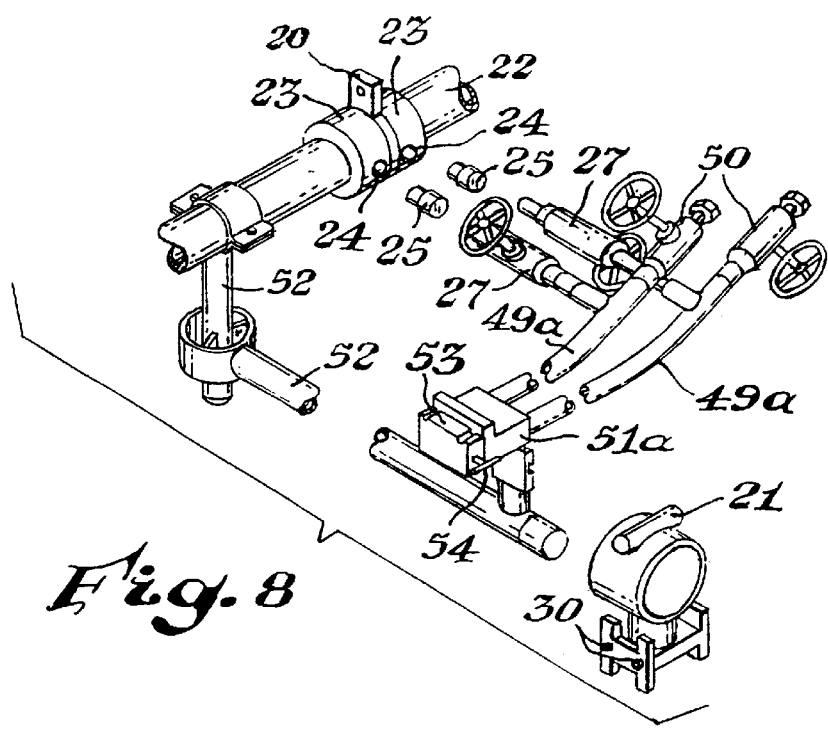
FIG. 8 shows a parts kit detail for an orifice plate differential pressure transducer on a horizontal pipe line for installation category 6B.

Referring now to FIG. 8, therein is shown a parts kit detail similar to that shown in FIG. 6 but for installation category 6B. The elements shown in FIG. 8 which are the same as FIG. 6 have the same reference numbers. The kit shown in FIG. 8 has a pipe manifold assembly 49a and a supported end 51 a. The pipe manifold assembly 49a is similar to the pipe manifold assembly 49 of FIG. 5 except that the pipes of the pipe manifold assembly 49a are longer that the pipes of the pipe manifold assembly 49 of FIG. 6. This longer length helps to better isolate the transducer 21 from the hot vapors of material.

Referring now to FIG. 9, therein is shown a parts kit detail similar to that shown in FIG. 7 but for installation category 7. The elements shown in FIG. 9 which are the same as FIG. 7 have the same reference numbers. The kit shown in FIG. 9 has a pipe manifold assembly 46b and a supported end 48b. The pipe manifold assembly 46b is similar to the pipe manifold assembly 46a of FIG. 7 except that the supported end 48b is elevated relative to the supported end 48a of FIG. 7. The elevation of the supported end 48b helps to keep cryogenic liquids of the material away from the transducer 21 to better protect it from the cold. Instead, the transducer 21 tends to be exposed to vapors of the material which have less heat capacity.

Referring now to FIG. 10, therein is shown a parts kit detail for measuring pressure in a pipe line or in a vessel for installation category 8, which includes a pressure transducer 50. A root valve 51 is positioned between the transducer 50 and a flange 52. A flush valve 53 is positioned on the other side of the transducer 50. The arrangement shown in FIG. 10, including the type of valves and welding connections used, facilitates rigorous cleaning of the system and reduces crevasses and pockets where contamination may collect.

Referring now to FIG. 11, therein is shown a parts kit detail for measuring pressure in a vessel 54 for installation categories 2, 3, 4, 5A, 5B, 6A, 6B, 7 and 9. The parts kit detail shown in FIG. 11 is similar in some respects to the parts kit detail shown in FIG. 4. A process isolation valve 55 is shown mounted on a nozzle 56 of the vessel 54. A flushing flange 57 is positioned between a remote pressure sensor assembly 58 and the valve 55. A support assembly 59 supports a pressure transducer 60. A capillary tube 61 connects the remote pressure sensor assembly 58 and the transducer 60 and helps to isolate the transducer 60 from the high temperature of the material. Flush valves 62 have the same function as the flush valves 45 of FIG. 4.

Referring now to FIG. 12, therein is shown a parts kit detail similar to that shown in FIG. 2 but for installation category 10. The elements shown in FIG. 12 which are the same as FIG. 2 have the same reference numbers. High pressure shut off valves 61 are used as well as a high pressure rated pressure transducer 62. A high pressure rated pipe manifold 63 is positioned between the bypass manifold 28 and the transducer 62. A support assembly 64 supports one end of the pipe manifold 63 as shown.

The method of this invention can be implemented by establishing a book of parts kit details, such as are described in Table II, and a means for establishing the different installation categories, such as is shown in FIG. 13 and summarized in Table I. When the installation category is determined, then flow, pressure, or level measurement can be selected. For most all applications there will be at least one parts kit detail that is applicable for the installation and which can be selected. However, it is preferable to incorporate the above described information in computer program for a general purpose digital computer and to add a number of enhancements to such a computer program.

The enhancements include the selection of the piping material, assuming a pipe manifold is used. Materials can include carbon steel and various stainless steels such as 316 type stainless steel or HASTELLOY C brand steel. In addition, the weld type, valve selection, bracket selection, flush ring selection, venturi or wedge connection dimensions, bolt selection, valve options, manifold material, alternate impulse line orientation, certification, the material of the eccentric adapters, testing, process flange and connection configuration, special cleaning, flange options for diaphragm seal pressure gauge installation details, painting, winterizing enclosures, additional blind flanges, direct weld valves and mounting bracket sizes for remote seal flush ring pressure details can be specified.

When the invention is implemented using a computer as discussed above, then when the instrument engineer has finished answering all of the prompts of the computer program, the program can be written to provide an order number for the kit which will allow a kit supplier to provide all of the parts for the kit, including optional enhancements such as winter enclosures and special painting. In addition, the computer program preferably prints a specification sheet including the price of the kit and the possibility for placing an order for the kit automatically by MODEM over telephone lines.

EXAMPLE 1

A parts kit detail was to be selected for the measurement of flow rate for a fifty millimeter diameter horizontal pipe containing flowing nitrogen. Applying the scheme of FIG. 13, this was determined to be a category 1 application. A direct mount orifice plate differential pressure system was selected. The parts kit detail which was applicable to this application was detail number 3411-00 as shown in FIG. 1.

EXAMPLE 2

A parts kit detail was to be selected for the measurement of level in a vessel containing fifty weight percent sodium hydroxide in water. The vessel was vented to the atmosphere at the top of the vessel. Applying the scheme of FIG. 13, this was determined to be a category 4 application. A pressure transducer was selected with flush and drain capability. The parts kit detail which was applicable to this application was detail number 4404-02 as shown in FIG. 4. The flange 44 is a model AFW flush ring available from Rosemount, supra.

EXAMPLE 3

A parts kit detail was to be selected for the measurement of pressure in a vessel containing nitrogen at two hundred and twenty degrees centigrade. Applying the scheme of FIG. 13, this was determined to be a category 9 application. A pressure transducer with pancake type remote seal was selected. The parts kit detail with is applicable to this application was detail number 5576-52 as shown in FIG. 11. The flange 57 was a model AFW flush ring available from Rosemount, supra.

What is claimed is:

1. A computer implemented method for selecting a specific parts kit detail from an inventory of pre-designed parts kit details for the installation of a pressure transducer on a pipe line or a vessel, the pipe line, or the vessel for containing a fluid material, the method comprising the steps of:

(a) developing a decision tree wherein the branches of the decision tree terminate in leafs and wherein each leaf of the decision tree denotes a specific installation category, the rules of the decision tree being defined by the properties of the fluid material which is to be contained in the pipe line, or the vessel and the operating requirements of the installed pressure transducer;

(b) establishing an inventory of different pre-designed parts kit details;

(c) assigning one or more pre-designed parts kit details to the different installation categories;

(d) using the decision tree to determine an installation category for the installation of a pressure transducer on a certain pipeline, or vessel;

(e) identifying at least one pre-designed parts kit detail from said inventory for installation of said pressure transducer on said certain pipe line, or vessel, said parts kit detail being identified based on the installation category determined under step (d); and (f) using steps (d) and (e) to specify a parts kit detail for the installation of a specific pressure transducer on said pipe line, or vessel.

2. The method of claim 1, wherein the pressure transducer is selected from the group consisting of an absolute pressure transducer and a differential pressure transducer and wherein the pipe line is selected from the group consisting of a horizontal pipe line and a vertical pipe line.

3. The method of claim 1, further comprising the step of repeating steps (d)–(e) to specify a plurality of parts kit details for the installation of a plurality of pressure transducers to be installed in a chemical processing facility.

4. The method of claim 3, further comprising the step of using a computer to provide order numbers for the parts kit details for the chemical processing facility.

5. The method of claim 4, wherein the parts kit details determined for the chemical processing facility are ordered automatically by a computer generated order.

* * * * *